United States Patent [19]

Bucher et al.

[11] Patent Number: 4,650,196
[45] Date of Patent: Mar. 17, 1987

[54] RING-LIKE RADIAL SHAFT-SEALING ELEMENT

[75] Inventors: Hans Bucher, Obergruppenbach; Richard Heinrich, Heilbronn; Waldemar Hermann, Neuenstadt; Hans-Werner Seffler, Abstatt, all of Fed. Rep. of Germany

[73] Assignee: KACO GmbH & Co., Heilbronn, Fed. Rep. of Germany

[21] Appl. No.: 883,617

[22] Filed: Jul. 9, 1986

[30] Foreign Application Priority Data

Jul. 9, 1985 [DE] Fed. Rep. of Germany ....... 3524461

[51] Int. Cl.$^4$ ............................................. F16J 15/32
[52] U.S. Cl. ..................................... 277/152; 277/22; 277/153
[58] Field of Search .................. 277/22, 134, 152, 153, 277/166

[56] References Cited

U.S. PATENT DOCUMENTS

| | | | |
|---|---|---|---|
| 2,736,585 | 2/1956 | Riesing | 277/153 |
| 2,804,325 | 8/1957 | Riesing | 277/134 X |
| 2,968,498 | 1/1961 | Saunders | 277/152 X |
| 3,495,843 | 2/1970 | Andersen et al. | 277/153 X |

FOREIGN PATENT DOCUMENTS

| | | | |
|---|---|---|---|
| 2435675 | 2/1975 | Fed. Rep. of Germany | 277/153 |
| 3125688 | 1/1983 | Fed. Rep. of Germany | 277/152 |

*Primary Examiner*—Robert S. Ward
*Attorney, Agent, or Firm*—Becker & Becker

[57] ABSTRACT

A ring-like, radial, shaft-sealing element that is provided with a relatively rigid sealing member embodied as a molded member. The sealing member is spaced from a support member, and is connected to the latter via a spring member. Formed between the sealing member and the support member is a radially effective, free spring portion that, during a radial movement or wobble of a shaft that is to be sealed off, has a sufficient elasticity in order to allow the radial movement to be followed. The sealing member has a relatively great thickness that alone provides for the static and dynamic sealing of the sealing element. The sealing member is disposed in a recessed portion of the spring member, with this recessed portion being opened in the direction toward the end face of the spring member. The sealing member extends beyond this end face, with this projecting portion of the sealing member sealingly resting against the shaft.

11 Claims, 4 Drawing Figures

RING-LIKE RADIAL SHAFT-SEALING ELEMENT

BACKGROUND OF THE INVENTION

The present invention relates to a ring-like, radial, shaft-sealing element.

With on known radial shaft-sealing element (U.S. Pat. No. 2,736,585), a sealing member, embodied as a molded member, is placed in a recessed portion of a spring member. The sealing member covers half of the axial width of the end portion of the spring member. Since in the installed state the sealing member rests against the shaft that is to be sealed under prestress, the sealing member is heated up during operation. Furthermore, since the sealing member is partially embedded in the spring member, which is made of elastomeric material, the heat that is generated during operation cannot be dissipated to a sufficient extent by the sealing member. For this reason, the sealing member is subjected to increased wear.

Radial shaft-sealing elements are also known (U.S. Pat. No. 2,804,325) where the spring member, which is made of flexible material, is embodied as a sealing flange, the free end of which is provided with a sealing lip. The sealing portion is embodied as a foil of polytetrafluoroethylene, and is secured to the sealing lip. The sealing portion extends all the way to the support member, to which it is secured. The sealing part or member thus shields the spring member over the entire axial length, and over the entire periphery, relative to the shaft that is to be sealed off. Since the sealing member is made of polytetrafluoroethylene, it has a relatively great rigidity, which is an advantage for the sealing function. However, in the region between the sealing region that rests against the shaft and the support member, the sealing member is not very flexible due to this rigidity. If the shaft, due to some eccentricity, experiences a radial movement or wobble, the sealing member cannot absorb such a movement to a sufficient extent. The stresses that result due to the radial movement or wobble are transmitted along to the sealing surface via that portion of the sealing member that is disposed between the support member and the actual sealing region. As a result, a deformation of the sealing member occurs in the sealing region, thus considerably reducing the sealing capacity.

It is an object of the present invention to embody a radial shaft-sealing element in such a way that while retaining the sealing contact of the sealing member, even during radial movement or wobble of the shaft, the heat that is generated during operation in the sealing member can be rapidly dissipated, so that the sealing member is stressed only slightly.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The ring-like, radial, shaft-sealing element of the present invention comprises: a support member; a flexible spring member having a first end connected to the support member, and a second end that is remote from the first end; at a distance from the first end, the spring member is provided with a recessed portion that is opened in the direction toward the second end, with a radially effective spring portion being formed between the recessed portion and the first end of the spring member; and a relatively rigid sealing member, in the form of a molded member, that is disposed in the recessed portion and is thus spaced from the support member, with the sealing member extending beyond the second end of the spring member, with this projecting portion of the sealing member being adapted to sealingly rest against a shaft.

With the inventive radial shaft-sealing element, the sealing member is, to a large extent, free, so that the medium that is to be sealed off can flow around the sealing member. As a result, the heat that results during operation due to friction with the machine component that is to be sealed off is rapidly dissipated from the sealing member. The latter is therefore subjected to only relatively little wear, so that the inventive radial shaft-sealing element has a long service life. Since the sealing member projects beyond the end face of the spring member, and the recessed portion is opened in the direction toward the end face of the spring member, the particularly critical region of the sealing member, namely that end of the latter that projects beyond the spring member, is free, so that the medium that is to be sealed off can flow completely around this end of the sealing member. Not the entire inner side of the sealing member rests against the component that is to be sealed off; rather, only that portion of the sealing member that projects beyond the spring member rests against the component that is to be sealed off. During operation of the inventive radial shaft-sealing element, the greatest heat results at this location. Due to the previously described configuration, this heat can be satisfactorily dissipated by the sealing medium itself, so that the sealing member heats up only slightly.

Further specific features of the present invention will be described in detail subsequently.

DESCRIPTION OF PREFERRED EMBODIMENTS

Figure 1:
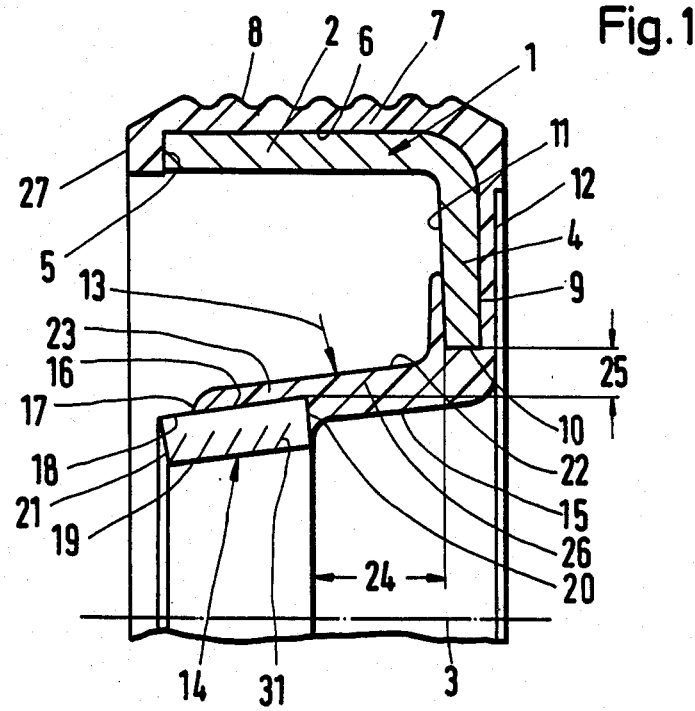
FIG. 1 is an axial cross-sectional view showing half of a first embodiment of an inventive radial shaft-sealing element.

Referring now to the drawings in detail, the ring-like radial shaft-sealing element of FIG. 1 includes a support member 1 that has an L-shaped cross-section; the support member 1 can be made of metal, plastic, or some other hard material. The support member 1 has a ring-shaped or annular sleeve portion 2 which merges into a base portion 4 that extends at right angles to the axis 3 of the sealing element. The end fact 5 and the outer side 6 of the sleeve portion 2 of the support member 1 are covered with a covering 2 that is made of an elastic material, and that is provided on its outer side with a wave-shaped profiling 8. In the installed state, this profiling 8 assures a secure seating of the inventive sealing element in a housing that receives the radial shaft-sealing element. The covering 7 also extends to beyond the outer side 9 and the end face 10 of the base portion 4, as well as over a portion of the inner side 11 of the base portion 4. On the inner side 11 of the base portion 4, the covering 7 can extend about halfway up the radial width of the base portion. The outer side of the support member 1 is thus completely covered by the covering 7.

That part of the covering 7 that covers the outer side 9 of the base portion 4 is provided with a recessed portion 12 that extends to the level where the base portion 4 merges into the sleeve portion 2 of the support member 1.

The covering 7 continues into a spring member 13 which, in the direction toward its free end, is conically tapered; however, the spring member 13 could, for example, also have a constant thickness. It would also be possible to separately secure the spring member 13 to the support member 1 or to the covering 7 thereof. The free end of the conical spring member 13, which is made of elastomeric material, is provided with a ring-shaped or annular sealing member 14 that is made of polytetrafluoroethylene. The free end of the inner side 15 of the spring member 13, which faces the shaft that is to be sealed off, is provided with a recessed portion 16 that is open in the direction toward the end face 17 of the spring member 13. The annular sealing member 14 is placed in the recessed portion 16, and projects in the axial direction beyond the end face 17. In addition, the sealing member 14 projects radially inwardly beyond the inner side 15 of the spring member 13. This assures that in the installed state, the radial shaft-sealing element rests upon the shaft that is to be sealed off exclusively via the sealing member 14.

In the illustrated embodiment, the sealing member 14 has a rectangular cross-section; however, any other suitable cross-sectional shape, for example a conical cross-section, could be used. The radially outer and radially inner long sides 18 and 19 of the sealing member 14 are disposed at an acute angle relative to the axis 3 of the sealing element. Correspondingly, the two short sides 20 and 21 of the sealing member 14 are disposed at an acute angle to the respective radial planes of the shaft-sealing element.

The inner side 15 and the outer side 22 of the spring member 13 are disposed at a smaller acute angle relative to the axis 3 of the sealing element than are the long sides 18 and 19 of the sealing member 14. However, the long sides 18, 19 of the sealing member 14, and the two outer sides 15 and 22 of the spring member 13, could also extend parallel to one another.

That portion 23 of the spring member 13 that covers part of the length of the radially outer long side 18 of the sealing member 14 is approximately only half as thick as the sealing member 14. In order to obtain a secure connection or bond between the sealing member 14 and the spring member 13, the portion 23 of the latter extends over more than half of the length of the outer surface 18 of the sealing member 14. Furthermore, in the region of the short side 20 of the sealing member 14 that faces the base portion 4 of the support member 1, the spring member 13 is widened to such an extent that it is connected to the sealing member 14 over nearly the entire thickness thereof. In order not to adversely affect the great flexibility of the spring member 13, the thickness of the latter decreases from the sealing member 14.

The sealing member 14 is axially spaced by the distance 24 from the base portion 4 of the support member 1. In addition, since the conical spring member 13 is inclined at an angle radially inwardly from the base portion 4, the sealing member 14, when viewed in the axial direction, is also radially spaced by the distance 25 from the base portion 4. The portion of the spring member 13 disposed between the sealing member 14 and the base portion 4 forms a radially effective free spring portion 26 which, when the shaft rotates, can absorb or accomodate a radial movement or wobble, so that the sealing member 14 can follow the shaft in an unobstructed manner that is free of any lag.

The sealing member 14 is embodied as a cone that opens in the direction toward the base portion 4 of the support member 1. The sealing member 14 is axially spaced from the end face 27 of the covering 7 within the radial shaft-sealing element. As a result of its conical configuration, in the installed state only a portion of the axial length of the sealing member 14 rests upon the shaft that is to be sealed off. Since the sealing member 14, which is made of polytetrafluoroethylene, rests against the shaft under prestress, a snug contact of the sealing surface 19 against the shaft that is to be sealed off is assured. The sealing surface 19 of the sealing member 14 is provided with a return mechanism 31, such as in the nature of a return winding. Due to the described configuration of the sealing member 14, a very high pump effectiveness is achieved by the return mechanism 31. As a result, a high pump capacity can be achieved with the inventive radial shaft-sealing element via the sealing member 14. If the rotating shaft is out of the round or has a radial wobble, the latter will be absorbed by the flexible spring portion 26 which can follow the radial wobble. As a result, the sealing member 14 can also follow the movements of the rotating shaft in an unobstructed manner. The spring characteristics of the spring member 13 can be optimally established by an appropriate thickness of the spring portion 26 as well as by selecting the material in conformity with the respective application. Example of suitable materials for the spring member 13 and spring portion 26 thereof are rubber, elastomeric materials and similar materials. The sealing member 14 can be connected or bonded with the spring member 13 in a manner known per se, such as by being heat-fused thereto, glued thereto, clamped thereto, vulcanized thereto, etc. In the embodiment of FIG. 1, the spring member 13 is bent radially outwardly when the radial shaft-sealing element is placed upon the shaft that is to be sealed. As a result, the contact pressure required for sealing is achieved in the region of the sealing member 14.

Figure 2:
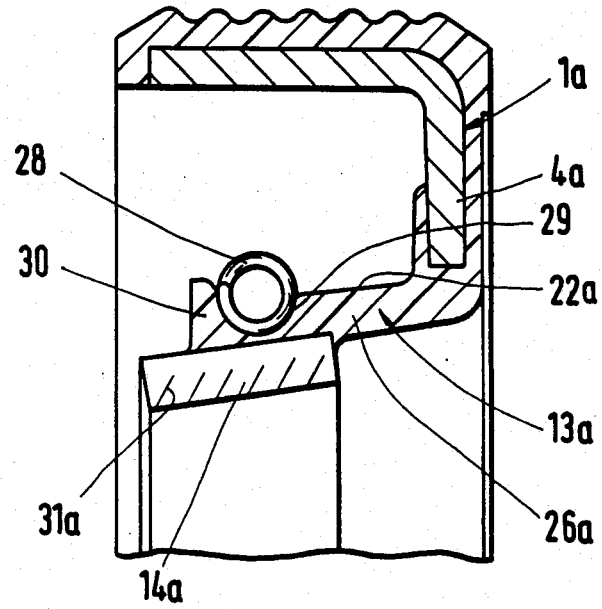
FIG. 2 is a view similar to that of FIG. 1 showing a second embodiment of an inventive radial shaft-sealing element.

In the embodiment of FIG. 2, a circular spring 28 is provided to produce the contact pressure. This circular spring 28 is disposed in an annular groove 29 in the outer side 22a of the spring member 13a. To axially secure the circular spring 28, the free end of the spring member 13a is provided with a thicker portion 30. In other respects, the radial shaft-sealing element of FIG. 2 is essentially embodied in the same way as the embodiment of FIG. 1. As shown in FIG. 2, the axial distance 24 between the sealing member 14a and the base portion 4a of the support member 1a can be less than was the situation with the previously described embodiment. The spring characteristic can also be adjusted by the axial length of the spring portion 26 or 26a. The sealing member 14a is longer and thinner than the sealing member 14 of the previously described embodiment. The sealing member 14a is also provided with a return mechanism 31a that is embodied as a return winding or can be formed by helical grooves.

In both of the described embodiments, the sealing function and the spring function are carried out by different components, which can therefore be embodied and arranged in an optimum fashion in conformity with their respective application. With regard to the selection of the material, the strength, and the length, the spring member 13, 13a and the sealing member 14, 14a can be embodied in such a way that optimum effects are achieved not only for the sealing capacity but also for the elasticity. Outstanding dynamic operating characteristics are achieved with the inventive radial shaft-sealing element. Even when a radial movement or wobbling of the shaft occurs, the high sealing capacity of the sealing member 14, 14a is not adversely affected.

Figure 3:
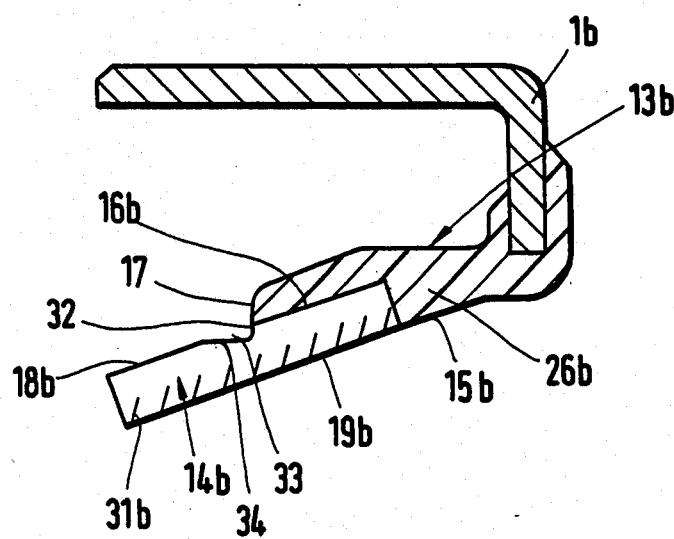
FIG. 3 shows a third embodiment of an inventive radial shaft-sealing element.

In the embodiment of FIG. 3, the sealing member 14b also extends beyond the end face 17 of the spring member 13b. About half of the length of the sealing member 14b is disposed in the recessed portion 16b of the spring member 13b, with this recessed portion being open toward the end face 17. The underside 19b of the sealing member 14b is disposed in the same plane as the inner side 15b of the spring portion 26b of the spring member 13b.

The end face 17 of the spring member 13b continues into a wall 32 of a recessed portion 33 in the upper side 18b of the sealing member 14b. In a continuously curved manner, the wall 32 merges into a base portion 34 of the recessed portion 33. The base portion 34 is disposed at approximately a right angle to the wall 32, and is connected at an obtuse angle to the upper side 18b of the sealing member 14b. The thickness of the spring member 13b preferably increases continuously from the support member 1b in the direction toward the sealing member 14b. The latter has a rectangular cross-sectional shape, and the underside 19b thereof is provided with the return mechanism 31b that can again be embodied as a return winding or can be formed by helical grooves.

Figure 4:
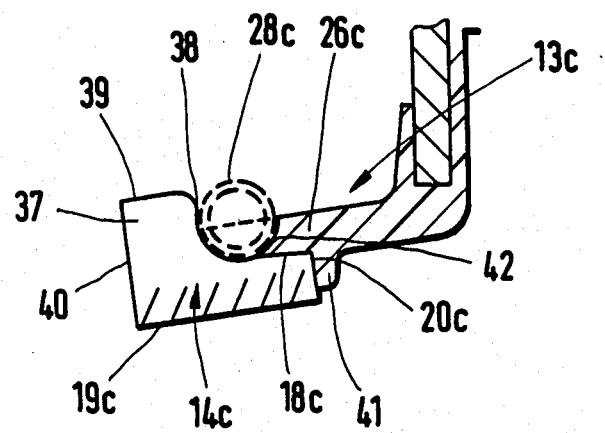
FIG. 4 shows a fourth embodiment of an inventive radial shaft-sealing element.

In the embodiment of FIG. 4, an increase in the mass is achieved via the sealing member 14c. The latter has an enlarged or wider end portion 37 that projects radially outwardly beyond the spring portion 26c of the spring member 13c. The radially outer long side 18c of the sealing member 14c merges in a continuously curved manner into the one end face 38 of the end portion 37. The end face 38 extends radially outwardly and is connected at approximately at right angle to the end face 39. The latter, in turn, is connected at approximately a right angle to the end face 40, which extends parallel to the short side 20c of the sealing member 14c. The end face 40 and the short side 20c are connected by the long side 19c that extends at right angles thereto. The spring portion 26c is connected to the end face 38 of the end portion 37, and is provided with a radially inwardly projecting circumferential flange 41 against which the small side 20c of the sealing member 14c rests. The height of the flange 41 is less than the thickness of the sealing member 14c. In other respects, the sealing element of FIG. 4 is embodied in the same manner as the embodiment of FIG. 1.

The dashed lines in FIG. 4 illustrate yet another embodiment. With this further embodiment, the spring portion 26c ends at a distance from the end portion 37 of sealing member 14c. Accommodated in the receiving space 42 thus formed is a circular spring 28c that in the installed state of the sealing element produces a contact pressure.

In all of the described embodiments, the sealing member is formed by a tube that is considerably thicker than a foil or thin sheet, and thus merely as a result of this thickness provides for the static and dynamic sealing. The sealing member is preferably made of polytetrafluoroethylene. However, it can also be made of other suitably rigid materials, such as polyester elastomers or polyurethane.

In the described embodiments, the sealing function and the spring function is undertaken by two separate components, which as a result can be optimally adapted to their respective function. The sealing member 14 to 14c, which is preferably made of polytetrafluoroethylene, assures, as a result of its rigidity, a tight, sealing contact against the shaft that is to be sealed off. If radial movement or wobble of the shaft occurs, such movement is absorbed by the radially effective free spring portion 26 to 26c, which is disposed between the sealing member 14 to 14c and the support member 1, 1a, 1b. As a result of its flexible configuration, the spring portion 26 to 26c is sufficiently elastic to compensate for the out of roundness of the shaft. Thus, the radial movement or wobble of the shaft is absorbed by this free, flexible portion 26 to 26c, so that the solid and hence rigid sealing member 14 to 14c can follow the shaft in an unobstructed manner and without lag. By dividing the sealing and spring functions between two different components, the sealing member 14 to 14c can be relatively thick, so that it can be produced in a simple manner from a tubular piece, and can be connected to the spring member 13 to 13c. Since the sealing member 14 to 14c is a molded member having a considerable thickness in comparison to a foil, it alone provides for the static and the dynamic sealing of the radial shaft-sealing element.

The present invention is, of course, in no way restricted to the specific disclosure of the specification and drawings, but also encompasses any modifications within the scope of the appended claims.

What we claim is:

1. A ring-like, radial, shaft-sealing element that comprises:
    a support member;
    a flexible spring member having a first end connected to said support member, and a second end that is remote from said first end; at a distance from said first end, said spring member is provided with a recessed portion that is open toward said second end, with a radially effective spring portion being formed between said recessed portion and said first end of said spring member; and
    a relatively rigid sealing member, in the form of a molded member, that is disposed in said recessed portion and is thus spaced from said support member, with said sealing member extending beyond said second end of said spring member, with this projecting portion of said sealing member being adapted to sealingly rest against a shaft.

2. A sealing element according to claim 1, in which said sealing member has an essentially rectangular cross-sectional shape.

3. A sealing element according to claim 1, in which at least half of the axial width of said sealing member, on that side thereof remote from said shaft, is covered by said spring member.

4. A sealing element according to claim 1, in which said sealing member has a strengthened portion in the vicinity of said second end of said spring member.

5. A sealing element according to claim 4, in which that end of said sealing member remote from said recessed portion is a widened end portion that forms said strengthened portion.

6. A sealing element according to claim 5, in which said widened end portion of said sealing member projects radially outwardly beyond said second end of said spring member.

7. A sealing element according to claim 5, in which said end portion of said sealing member has an axially inwardly directed end face against which said second end of said spring member abuts.

8. A sealing element according to claim 5, in which said spring member is provided with at least one radially inwardly projecting extension against which said sealing member rests and is secured.

9. A sealing element according to claim 8, in which said extension is a circumferential flange.

10. A sealing element according to claim 1, in which that surface of said sealing member that rests against said shaft is flush with a radially inwardly directed side of said spring member.

11. A sealing element according to claim 1, in which said sealing member is made of polytetrafluoroethylene.

* * * * *